O. HUSSEY.
Mower.
No. 24,641.　　　　　　　　　　　　　　Patented July 5, 1859.
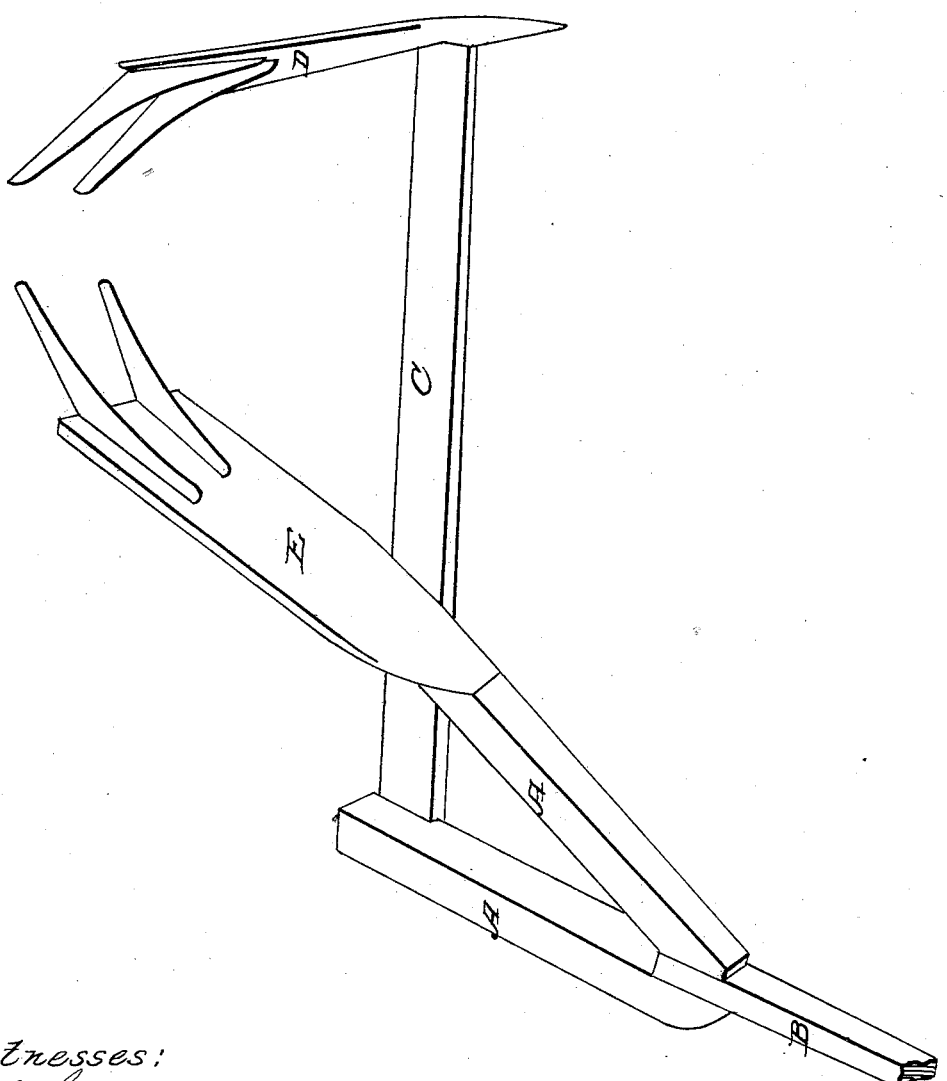
Witnesses:
A. B. Stoughton
Tho. H. Heffernan
Inventor:
Obed Hussey

UNITED STATES PATENT OFFICE.

OBED HUSSEY, OF BALTIMORE, MARYLAND.

IMPROVEMENT IN MOWING-MACHINES.

Specification forming part of Letters Patent No. 24,641, dated July 5, 1859.

*To all whom it may concern:*

Be it known that I, OBED HUSSEY, of the city and county of Baltimore, and State of Maryland, have invented an Improvement in that part of a mowing-machine which acts on the cut grass after it passes over the finger-beam; and I do hereby declare the following to be a full, clear, and exact description of the construction and operation of the same, reference being had to the accompanying drawing, making a part of this specification, and which represents so much of a mowing-machine as will illustrate the invention.

A track-clearer has been heretofore used on the outside shoe, divider, or other outside portion of a mower. This I do not claim; but the nature of my invention consists in putting what may be termed a "track-clearer" at the end of the cutting apparatus, near the gearing or the main-frame side of the machine, so that said track-clearer may act in conjunction with the outer track-clearer in sweeping the cut grass into a windrow toward the middle of the swath.

The ordinary apparatus, fixed to the extreme end of the finger-beam opposite the main frame and gearing, usually called the "track-clearer," and performing that function, I do not propose to alter; but I propose to add to the machine a similar apparatus at the end of the cutting apparatus next the gearing and opposite to the usual track-clearer, thus having a track-clearer on each side of the swath, so as to sweep the cut grass into a windrow toward the center of the swath.

To enable others skilled in the art to make and use my invention, I will proceed to describe the same with reference to the drawing.

A may represent the main timbers or frame, B the tongue, and C the finger-beam connected to or with the frame.

D represents the ordinary outside track-clearer, which may be made in any of the forms known or used for the purpose.

E is the additional track-clearer on the opposite end of the finger-beam. It may be of the same form and size of the one D, and extend back as far as that does, and at the same angle vertically and horizontally, though its latter inclination is toward and not parallel with the outside track-clearer. The action of both track-clearers is nearly the same—viz., to move the cut grass toward the center of the swath, and thus comb it up into a windrow at that line.

A twofold object attaches to this new track-clearer:

First. It has become the general practice to begin mowing with the machine without having previously cut a swath or track with a scythe. The horses are driven into the grass with the cutter in operation. After passing across the field it is found that the usual track-clearer has turned away the cut from the standing grass on one side of the swath only, while on the other side the cut grass lies entangled with that left uncut, and before the machine can return and cut the grass which the horses previously passed over the cut grass must be raked away from it. This raking is saved by my new track-clearer.

Second. It is found in practice that the cut grass which is disturbed by the usual track-clearer on the outside of the swath is in better condition to dry than that which runs over the finger-beam undisturbed, or not turned up or over; and as the usual track-clearer only disturbs half the width of the swath, the other half would be left undisturbed but for the action of the new track-clearer.

The rear ends of these track-clearers may terminate in ribs; but there must be space enough left between them to allow the grass to escape and not be dragged by them. Their rear ends may also be higher than their points of attachment to the finger-beam. The only thing to be guarded against is not to so contract the space between or under the heels of the track-clearers as to cause the grass to choke therein.

Having thus fully described the nature and object of my invention, what I claim therein as new, and desire to secure by Letters Patent, is—

In combination with the ordinary apparatus fixed to the extreme end of the finger-beam, and called a "track-clearer," a similar apparatus at the opposite or frame end of said beam, when so arranged as to sweep the cut grass toward the center of the swath and leave it in a windrow behind the machine, substantially as herein described.

OBED HUSSEY.

Witnesses:
A. B. STOUGHTON,
THOS. H. UPPERMAN.